March 3, 1936.  H. L. HEXAMER  2,032,480
AXLE HOUSING
Filed July 7, 1933
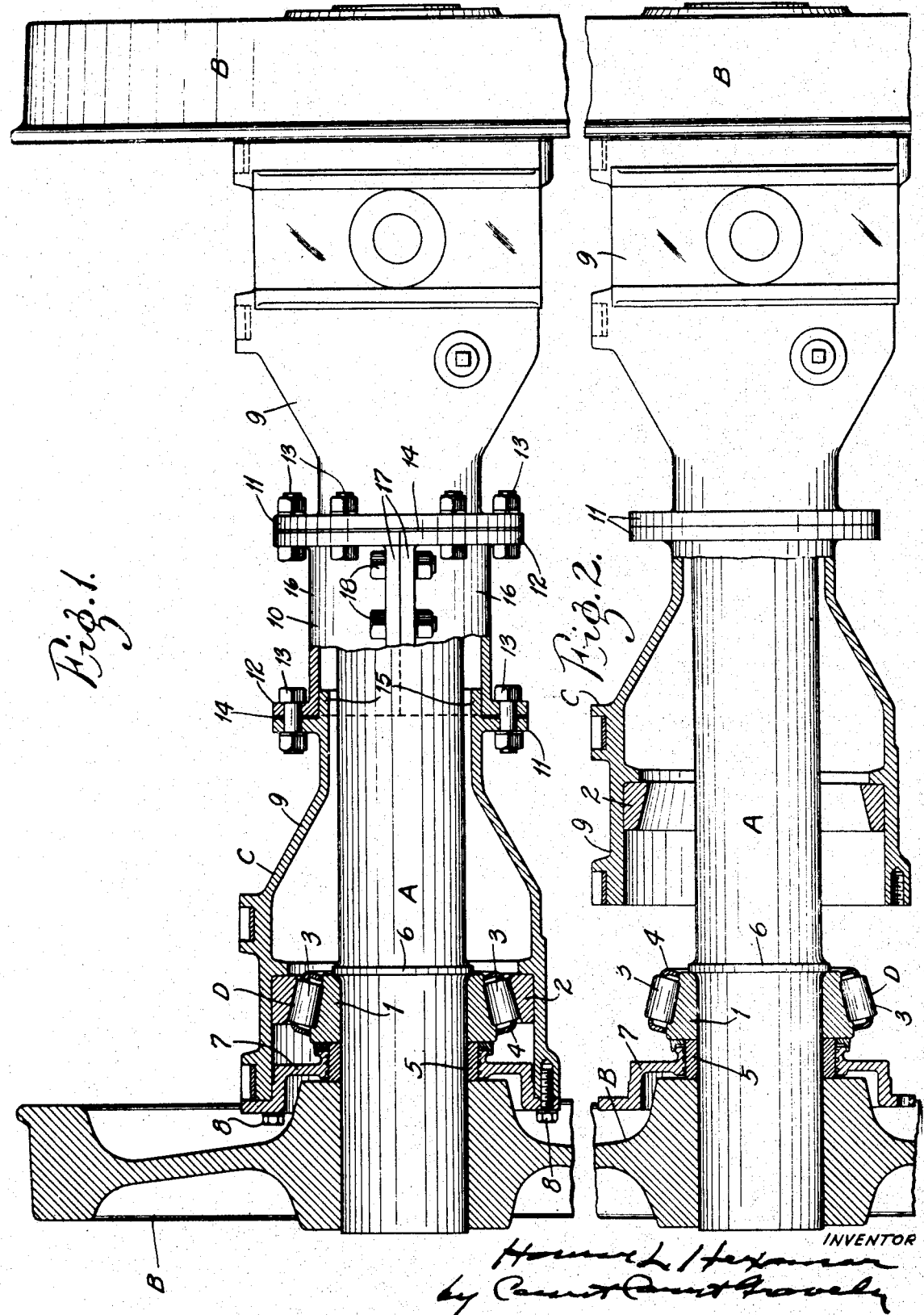
INVENTOR
Howard L. Hexamer
by his ATTORNEYS Patented Mar. 3, 1936

2,032,480

UNITED STATES PATENT OFFICE 2,032,480

AXLE HOUSING

Homer L. Hexamer, Canton, Ohio, assignor to The Timken Roller Bearing Company, Canton, Ohio, a corporation of Ohio Application July 7, 1933, Serial No. 679,342

2 Claims. (Cl. 295—36)

This invention relates to axle housings, particularly axle housings of the inboard type wherein the axle housings completely enclose the axle and antifriction bearings are interposed between the ends of the housing and axle. The invention has for its principal object an axle housing construction that will permit inspection of the bearings without requiring the wheels or bearings to be removed. The invention consists principally in an axle housing comprising bearing receiving end sections connected together by a longitudinally split intermediate section; and it also consists in the construction, combinations and arrangement of parts hereinafter described and claimed.

In the accompanying drawing, which forms part of this specification and wherein like symbols refer to like parts wherever they occur, Fig. 1 is a half-elevational and half-longitudinal sectional view of a roller bearing car axle provided with an axle housing embodying my invention, Fig. 2 is a view similar to Fig. 1, showing the middle section of the housing removed and one of the end sections drawn inwardly to expose the bearing that cooperates therewith.

Referring to the accompanying drawing, my invention is shown in connection with a roller bearing railway car axle construction comprising an axle A having wheels B on the ends thereof and an axle housing C of the inboard type enclosing the axle between wheels. Interposed between the axle A and each end of the axle housing C is an antifriction bearing, preferably a taper roller bearing D arranged with the small ends of its rollers facing inwardly. Said bearing comprises a cone or inner raceway member 1 mounted on the axle, a conical cup or outer raceway member 2 mounted in the housing, and a circular series of taper bearing rollers 3 interposed between said raceway members and held in place on the inner member by a suitable retaining cage 4. In the construction shown, a spacing sleeve 5 is mounted on the axle A between the cone 2 and the hub of the wheel B and serves to hold said cone against a rib 6. A suitable closure ring 7 is removably secured to the end of the axle housing by means of cap screws 8 and serves to close the annular space between the spacing sleeve 5 and the housing.

According to the present invention, the axle housing C is made in three sections, namely, two end sections 9 and an intermediate section 10. The adjacent ends of each end section 9 and the intermediate section 10 are provided with cooperating outstanding flanges 11 and 12, respectively, that are removably secured together by bolts 13, a suitable shim 14 being interposed between said flanges for adjusting the bearing at the outer end of said end section. The end and intermediate sections are held in axial alinement by means of an extension 15 at the inner end of each end section, which extension has a snug fit in the intermediate section. The intermediate section 10 is split lengthwise in the plane of the axis of the housing axle to form two separable parts 16. Flanges 17 extend along the edges of the split between said parts and are secured together by bolts 18. As the purpose of making the intermediate section removable is to enable the end sections to be shifted endwise to expose the bearings, it is obvious that the distance between the extensions 15 of the two end sections should be as long as the distance from the inner end of a bearing to the adjacent end of the housing in the assembled construction.

By the arrangement described, the removal of the end closure screws 8 and the bolts 13 and 18 permits the intermediate section 10 of the axle housing C to be removed from the axle A, and the end sections 9 to be drawn inwardly far enough to expose the roller bearings D. The cups remain seated in the end sections, where their bearing faces may be easily inspected. Thus, all parts of the bearings may be inspected without removing the wheels or end sections from the axle and the parts may be easily restored to their original position.

What I claim is:

1. A wheel and axle assembly comprising an axle, wheels mounted thereon, a housing enclosing said axle between said wheels and roller bearings between said axle and the ends of said housings, each of said bearings comprising an inner bearing member mounted on the axle, an outer bearing member mounted in the end portion of the housing and rollers interposed between said bearing members, said housing comprising end members and a longitudinally split middle member, each of said end members having a radial flange near its inner end and a projecting inner end portion, the parts of said middle housing member being seated on said projecting inner end portions and having radial end flanges cooperating with the adjacent flanges of said end members, fastening means extending through adjacent flanges and means for securing together the separable parts of said middle housing member, the distance between the end housing members, the distance between the end housing members being as great as the distance from the inner end of a bearing to the adjacent end of the housing and each end member being movable longitudinally of the axle upon removal of the middle member to permit inspection of its roller bearing.

2. A wheel and axle assembly comprising an axle, wheels mounted thereon, a housing enclosing said axle between said wheels and roller bearings between said axle and the ends of said housing, each of said bearings comprising an inner bearing member mounted on the axle, an outer bearing member mounted in the end portion of the housing and rollers interposed between said bearing members, said housing comprising end members and a longitudinally split middle member, each of said end members having a radial flange near its inner end and a projecting inner end portion, the parts of said middle housing member being seated on said projecting inner end portions and having radial end flanges cooperating with the adjacent flanges of said end members, shims for adjustment of said bearings being disposed between adjacent flanges, fastening means extending through adjacent flanges and means for securing together the separable parts of said middle housing member, the distance between the end housing members being as great as the distance from the inner end of a bearing to the adjacent end of the housing and each end member being movable longitudinally of the axle upon removal of the middle member to permit inspection of its roller bearing.

HOMER L. HEXAMER.